March 20, 1962 S. C. STRAUS 3,026,156
ADJUSTABLE SPINDLE BEARING
Filed May 26, 1960 3 Sheets-Sheet 1

INVENTOR.
S. Charles Straus.
BY
Wood, Herron & Evans.
ATTORNEYS.

March 20, 1962  S. C. STRAUS  3,026,156
ADJUSTABLE SPINDLE BEARING
Filed May 26, 1960  3 Sheets-Sheet 2
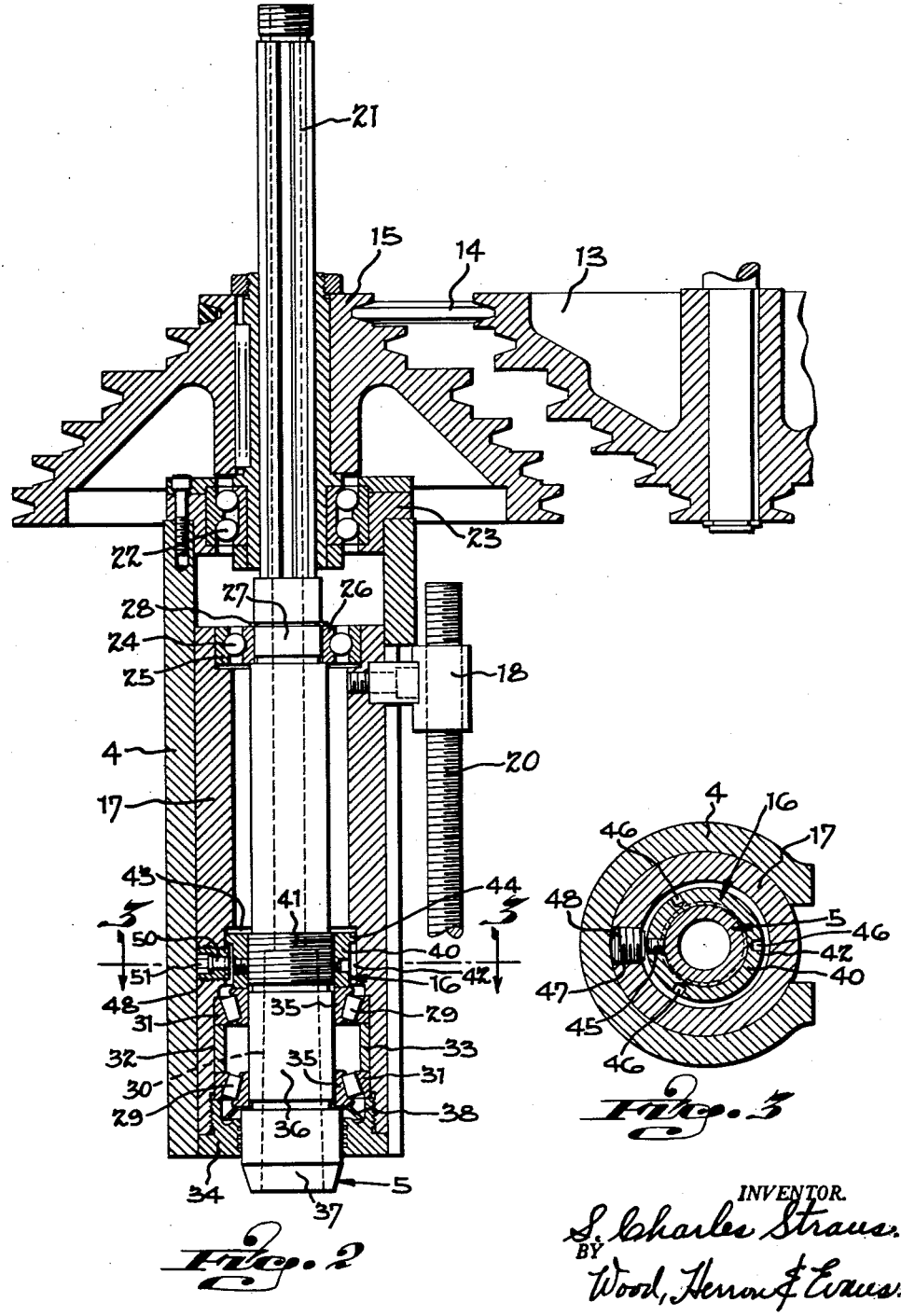
INVENTOR.
S. Charles Straus.
BY
Wood, Herron & Evans.
ATTORNEYS.

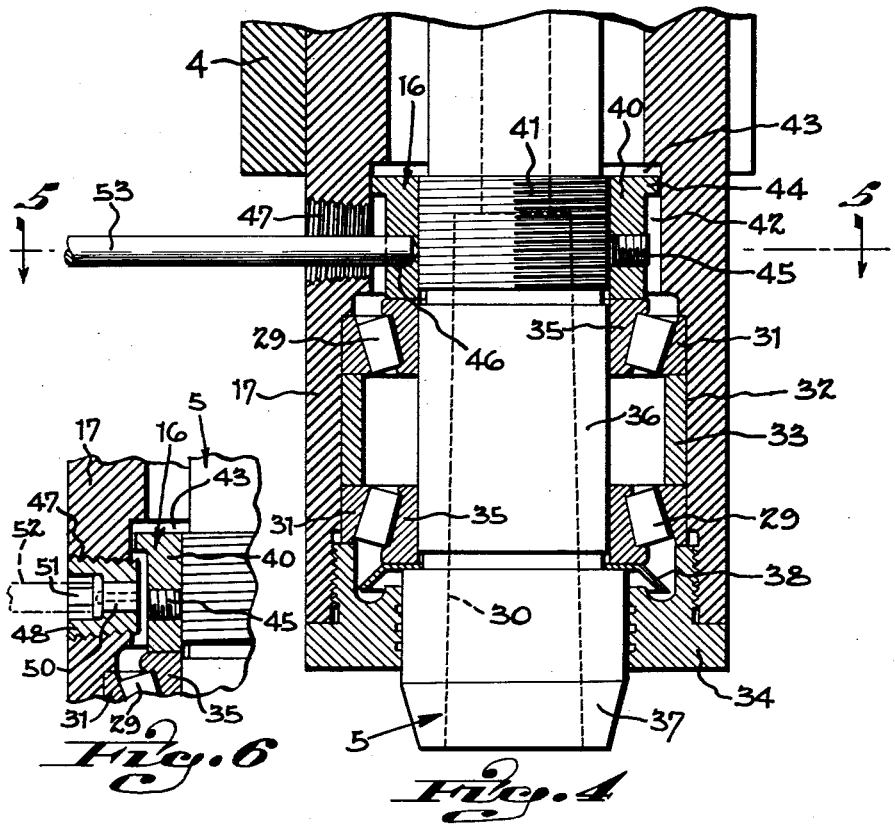
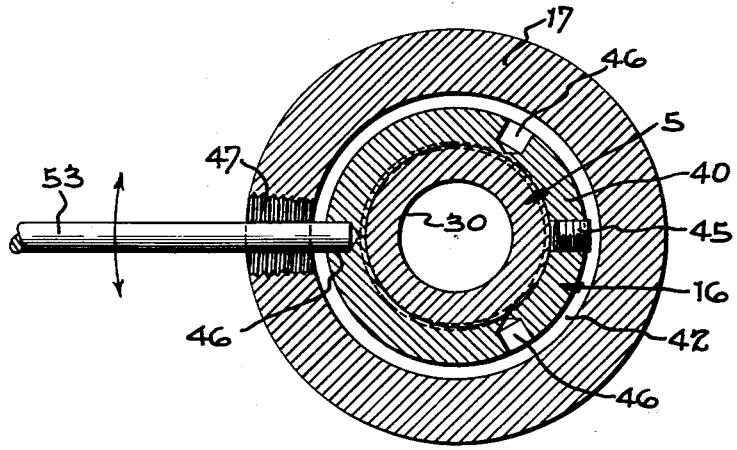

United States Patent Office 3,026,156
Patented Mar. 20, 1962

3,026,156
ADJUSTABLE SPINDLE BEARING
Samuel Charles Straus, Cincinnati, Ohio, assignor to Cincinnati Manufacturing Corporation, Cincinnati, Ohio, a corporation of Ohio
Filed May 26, 1960, Ser. No. 31,975
7 Claims. (Cl. 308—207)

This invention relates generally to machine tools and is particularly directed to improvements in the rotating spindle of the machine tool.

The invention is disclosed in relation to the spindle of a milling machine; however, it will be apparent from the following disclosure that the invention may be applied to the rotating spindle or equivalent rotating element of various other types of machine tools. In the operation of a milling machine, the spindle is driven over a wide range of cutting speeds, which are dictated by the type of material being milled, by the kind of cutting tool which is mounted in the spindle, and by other variable factors. By way of example, when machining relatively hard materials such as steel, the spindle must be driven at relatively slow speed and under high torque; as a consequence, the spindle bearings must provide a very close running fit in order to properly support the spindle for the desired cutting action. On the other hand, when milling softer materials, such as aluminum, fibrous materials and the like, then the best cutting action is obtained by rotating the spindle at a much higher cutting speed. However, at such higher cutting speeds, the spindle bearings will overheat if they are adjusted to the loaded or tight running fit which is appropriate for the slow cutting speeds of hard materials. Overheating of the bearings in this manner causes excessive wear which detracts from the accuracy and efficiency of the machine and, in some instances, caused failure of the parts, thereby decommissioning the machine and leading to expensive repairs.

It has been one of the primary objectives of the present invention to provide a machine tool spindle so arranged that the spindle bearings may be adjusted in a rapid, convenient manner to create a tight running fit for cutting hard materials at slow cutting speed, and to create a relatively loose running fit for rotating the spindle at high cutting speeds for machining softer materials.

A typical machine tool spindle, for which the invention is intended, is rotatably journalled within a quill, which in turn, is slidably mounted within the head of the machine tool, the arrangement being such that the quill may be fed axially so as to advance or retract the rotating spindle and its cutting tool relative to the work. In the case of a vertical milling machine, for example, the lower end of the spindle may be provided with a tapered socket for receiving the tapered shank of the cutting tool, while its upper end includes a splined or slotted shaft which provides an axially slidable driving connection with a driving member. The forces which are generated as a consequence of the cutting action of the tool naturally react against the quill at the socketed or lower end of the spindle and, for this reason, the adjustable spindle bearings are mounted in this area of the quill.

According to the present concept, the lower portion of the spindle is journalled in one or more anti-friction bearings having an adjustment ring arranged to regulate the running clearance of the bearings. In a preferred form of the invention, two opposed taper roller bearings are utilized, the bearings being arranged to absorb both radial and axial thrust, the adjustment ring taking advantage of the wedging action of the tapered rollers to tighten or loosen the bearing upon being turned in the appropriate direction.

The adjustment ring is provided with a set screw for locking it securely in its adjusted position. In order to provide convenient access to the adjustment ring, the lower portion of the quill is provided with an access hole which is normally closed with a threaded socket-type plug, the outer end of the plug being recessed with respect to the periphery of the quill so that the plug may pass into the bore of the tool head in the retracted position of the quill. In order to change the adjustment of the bearing for a higher or lower spindle speed, the quill is fed outwardly so as to bring the plug below the end of the head, then a socket-type wrench is applied to the plug socket to remove it. The adjustment ring is provided with pin sockets for engagement with a suitable tool, such as a pin, which is inserted through the access hole of the quill into one of the sockets, the set screw first having been loosened to permit the ring to be turned. The ring is then rotated in the desired direction either by rotating the spindle slightly or by holding the spindle and turning the ring with the tool. Thereafter, the set screw is tightened and the plug is replaced in the quill to prevent leakage of grease from the spindle bearings.

A further objective of the invention has been to provide an arrangement wherein the removable plug of the access hole includes a grease fitting, the arrangement being such that the plug serves the double purpose of providing access to the adjustment ring of the spindle bearings, and also of providing a recess for the grease fitting, whereby that the fitting may pass into the bore of the drill head without interference when the quill is shifted to its retracted position with respect to the head.

According to this aspect of the invention, the grease fitting, which is conventional, is pressed into a bore which is drilled through the plug from the inner end of its socket. In order to lubricate the spindle bearings, the quill is advanced from the drill head to expose the plug, then the nozzle of a grease gun is inserted into the socket of the plug and into coupling engagement with the grease fitting so as to feed the grease under pressure into the quill. Since the fitting is located at the inner end of the socket, it does not interfere with the socket wrench which is inserted in the socket for removal of the plug when it is necessary to change the bearing adjustment.

The various features and advantages of the invention will be more fully apparent to those skilled in the art from the following description taken in conjunction with the drawings.

In the drawings:

FIGURE 2 is an enlarged fragmentary sectional view of the head and quill, taken along line 2—2 of FIGURE 1, showing the general arrangement of the spindle bearing adjustment mechanism.

FIGURE 3 is a cross sectional view taken along line 3—3 of FIGURE 2, further illustrating the bearing adjustment.

FIGURE 4 is an enlarged fragmentary view taken from FIGURE 2, showing the manner in which the spindle bearings are adjusted.

FIGURE 5 is a cross sectional view taken along line 5—5 of FIGURE 4, further detailing the adjustment.

FIGURE 6 is a fragmentary sectional view similar to FIGURE 4, further detailing the combined closlure plug and grease fitting which is removed for adjusting the spindle bearings.

Figure 1:
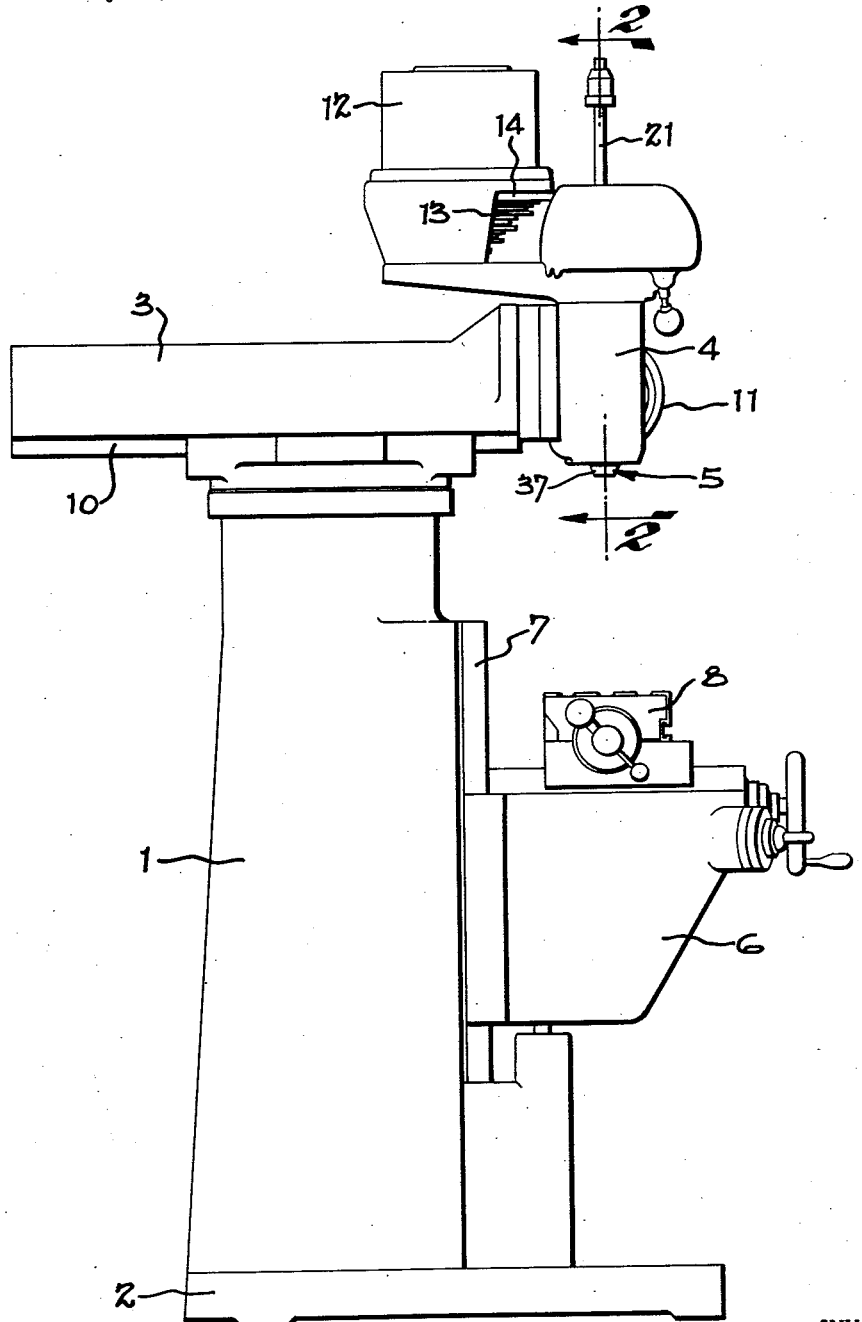
FIGURE 1 is a side elevation of a vertical milling machine of the type for which the present invention is particularly intended.

Referring to FIGURE 1, which illustrates one type of machine tool for which the present invention is intended, the vertical milling machine comprises a column 1 rising from a base 2, with an overarm 3 mounted at the top of the column for rotary adjustment about a vertical axis. A head 4 is mounted upon the outer end of the overarm for swivelling motion about a horizontal axis, and the spindle 5 is mounted for rotation within the head, the spindle being journalled in a quill and adapted to be fed axially with respect to the workpiece, as explained later. A knee 6 is mounted on the front of the column which is provided with slide ways 7, adapting the knee to be adjusted vertically along the column, the workpiece being mounted upon a table 8, which is slidably mounted upon the knee.

During the machining operation, the cutting tool (not shown) is mounted in the spindle 5, while the workpiece is mounted upon the table 8 which is provided with T-slots for clamping the workpiece rigidly in position. The overarm includes a slide 10 adapting the overarm and head to be adjusted along a horizontal path with respect to the table to bring the cutting tool to a desired position relative to the workpiece. During the cutting operation, the table 8 is fed along a horizontal path with respect to the knee 6, so as to feed the workpiece relative to the cutting end of the rotating tool. As described later, the spindle is also adjustable axially with respect to the head by operation of a hand wheel 11. The spindle is driven by a motor 12 having a multiple speed V-belt pulley 13 connected by a belt 14 to a second pulley 15 (FIGURE 2) which is slidably splined to the spindle 5, as explained later.

Referring to FIGURE 2, which shows the quill and spindle assembly in detail, the spindle bearing adjustment mechanism of the invention, which is indicated generally at 16, is located at the lower portion of the spindle within the quill 17. The quill is mounted for axial motion within the head 4 so as to feed the rotating spindle 5 relative to the workpiece. For shifting the quill, there is provided a nut 18 traversed by a screw shaft 20, which is in driving connection with the hand wheel 11, such that rotation of the hand wheel 11 and screw shaft raises or lowers the quill and spindle. To allow this axial quill motion, the upper end of the spindle includes a splined shaft 21, which is slidably keyed to the V-belt pulley 15, thus providing a slidable driving connection between the spindle and pulley. It will be understood that the pulley drive provides selective spindle speeds by shifting the belt 14 to the several grooves of the pulleys, the belt being shown in the high speed position in FIGURE 2.

The pulley 15 is journalled for rotation in a double row ball bearing, indicated at 22, which is mounted in a cage 23 secured to the upper end of head 4, the pulley being stabilized by the splined shaft of the spindle. The splined shaft, in turn, is stabilized by the spindle bearings which are carried by the quill 17.

As shown in FIGURE 2, the upper spindle bearing 24 comprises an outer race 25 which is seated in a counterbore formed in the upper portion of the quill. The inner race 26 is fitted upon a counterturned portion 27 of the spindle and is locked in place by a snap ring 28 which is engaged in a groove formed in the spindle, the race 26 thus being confined between the snap ring and the spindle shoulder which is delineated by the counterturned portion 27.

The lower spindle bearing, which is acted upon by the adjustment mechanism 16, comprises a pair of opposed taper roller bearings indicated at 29—29, the bearings being of the combined radial and axial thrust type, arranged to absorb the end thrust acting upon the spindle in either direction and also to provide variable bearing clearance in accordance with the setting of the adjustment mechanism 16. The taper bearings 29 are located at the lower portion of the spindle and surround the tapered socket 30 in which the tool (not shown) is socketed, such that the working faces are transmitted directly to the bearings thereby to provide a rigid support for the rotating tool.

As noted earlier, the spindle is operated under a very wide speed range in order to provide the proper cutting speeds for the various materials which are machined, and also in accordance with the type of tool which is mounted in the spindle. For example, if a steel workpiece is being machined, relatively slow spindle speed is required and the bearings 29 are adjusted or loaded to provide a relatively tight running fit, so as to properly support the cutting tool, thereby to bring about the most accurate and efficient cutting action. On the other hand, when he workpiece consists of a softer material, such as aluminum, fibrous materials and the like, then the best cutting action is obtained by rotating the spindle at a substantially higher speed. However, in this case, the bearings 29 will overheat if they are adjusted to a tight fit as required in cutting steel and the like, due to the speed or rotation. The adjustment mechanism 16 therefore is regulated to provide a running fit which is sufficiently loose to avoid the danger of overheating at the higher spindle speed.

Described in detail, the bearings 29 each include an outer race 31 which is seated in a counterbore 32 formed in the lower end of the quill (FIGURE 4). The two outer races 31 are held in spaced relationship by a collar 33 fitted in the counterbore 32. The lower end of the quill is provided with a threaded retainer ring 34 engaging the lower race 31, forcing the races and spacer 33 in clamping engagement with the shoulder which is delineated by the upper end of the counterbore 32, thus clamping the two outer races rigidly in position.

The inner races 35—35 are slidably fitted upon the counterturned portion 36 of the spindle above the nose 37. The lower inner race 35 is seated upon an oil control washer 38, which in turn, is seated upon the shoulder formed by the nose 37. The upper inner race 35 is engaged by the adjustment ring 40, which is screwed on the threaded portion 41 of the spindle, such that the loading of the bearings 29 is varied by rotating the adjustment ring 40, which forces the upper inner race toward the lower inner race. This ring is located in a counterbore 42 formed in the quill, the counterbore providing a clearance 43 above ring 40 for adjustment purposes. The upper end of the ring 40 includes a head 44 which snugly interfits the counterbore 42 to confine the grease which is forced into the bearing area, as explained later. The adjustment ring is locked in its adjusted position by a socket type set screw 45. As best shown in FIGURE 5, the adjustment ring 40 is provided with a series of pin sockets 46 about its periphery for engagement by a pin for making adjustments, as explained below.

As viewed in FIGURES 4 and 6, the quill 17 includes a threaded access hole 47 which is normally closed off by a threaded plug 48, the plug being screwed in sufficiently to clear the inside diameter of the head when the quill is shifted to its retracted positon. The plug 48 is of the socket type, permitting convenient removal through the use of an Allen type wrench for access to the adjustment ring, as explained below. As best shown in FIGURE 6, the plug 48 includes a grease fitting 50 at its inner end, the fitting preferably being press fitted into a bore formed at the inner end of the socket 51. The fitting 50 is conventional and permits grease to be applied by a suitable grease pressure gun 52 (shown in broken lines) which is inserted into the socket 51 and into engagement with the end of the fitting for supplying lubricant to the bearing 29.

It will be observed that the grease fitting 50 must be countersunk below the periphery of the quill in order to permit the quill to be retracted within the head in which it is slidably mounted. In other words, if the fitting were to be threaded directly into the wall of the quill, it would be necessary to counterbore the wall to form a recess for the fitting. Since the socket 51 of the plug 48 forms the recess for the fitting, the plug 48 serves the double purpose of acting as a closure for the access hole and of providing a recessed mounting for the fitting.

When it is necessary to change the loading of the bearings 29 for high or low spindle speed, the quill is fed downwardly, as indicated in FIGURE 4, to expose the plug 48 of the access hole 47. The plug 48 is then removed by inserting a wrench into the socket 51, then the spindle may be rotated by hand to bring the set screw 45 into alignment with the access hole. The set screw is then loosened with a suitable socket wrench so that the adjustment ring 40 may be rotated. After the set screw is loosened, the spindle is again rotated to bring one of the pin sockets 46 into alignment with the access hole so that a suitable tool, such as the pin 53 may be inserted. The ring 40 is then tightened or loosened, as the case may be, by swinging or shifting the tool 53 in an appropriate direction, as indicated by the arrow (FIGURE 5) while holding the spindle in a stationary position, or by turning the spindle while holding the tool stationary, or by a combination of both movements. When tightening or loosening the bearings, the operator is able to ascertain, by the turning resistance of the tool, when the desired adjustment is obtained. After making an adjustment, the tool 53 is removed and the spindle is again turned to bring the set screw 45 into alignment with the access hole, then the screw is tightened to lock the ring in adjusted position; thereafter, the plug 48 is replaced in the access hole 47.

Having described my invention, I claim:

1. An adjustable bearing structure for the rotating spindle of a machine tool, said spindle being journalled in an axially shiftable quill, said bearing structure comprising, an anti-friction bearing mounted in said quill and journalling the spindle therein, said bearing having an inner race embracing said spindle and having an outer race mounted within said quill, and an adjustment element mounted on the spindle within the quill and engaging one of said races, said adjustment element adapted to change the running fit provided by said anti-friction bearing upon regulation of the adjustment element, and a locking element mounted on the adjustment element, said locking element normally locking the adjustment element in adjusted position and adapted to be shifted to a release position, whereby the adjustment element may be regulated to change the running fit of the anti-friction bearing, said quill having an opening therein providing access to said locking element and to said adjustment element for adjusting the same.

2. An adjustable bearing structure for the rotating spindle of a machine tool, said spindle being journalled in an axially shiftable quill, said bearing structure comprising, an anti-friction bearing mounted in said quill and journalling the spindle therein, said quill adapted to confine lubricant in contact with said bearing, said bearing having an inner race embracing said spindle and having an outer race mouted within said quill, an adjustment ring threaded on the spindle within the quill and engaging one of said races, said adjustment ring adapted to change the running fit provided by said anti-friction bearing upon rotation of the adjustment ring relative to the quill, a locking element mounted on said adjustment ring and engageable with the spindle and normally locking said ring in an adjusted position, said locking element adapted to be shifted to a release position, whereby the adjustment ring may be rotated to change the running fit of the anti-friction bearing, said quill having an opening therein providing access to said locking element for shifting the same to a release position and to said adjustment ring for rotating the same, and a removable plug normally screwed into said opening and providing a closure for the lubricant within the quill.

3. An adjustable bearing structure for the rotatable spindle of a machine tool, said spindle being rotatably journalled in a quill which is shiftable axially within the bore of a head member of the machine tool, said bearing structure comprising, a pair of opposed tapered roller bearings journaling the spindle in said quill, said quill adapted to confine lubricant in contact with said roller bearings, said bearings having outer races mounted within said quill and having inner races embracing said spindle, said spindle having a shoulder thereon providing a seat for one of said inner races, an adjustment element mounted on the spindle within the quill and engaging the opposite of said inner races, said adjustment element adapted to change the running fit provided by said bearing structure upon adjustment thereof, a locking element mounted on the adjustment element, said locking element adapted to lock the adjustment element in a selected adjustment with reference to the spindle and adapted to be shifted to a release position, whereby the adjustment element may be regulated relative to the spindle to change the running fit provided by the opposed tapered roller bearings, said quill having an opening formed therein providing access to said locking element for releasing the same, said opening adapting a tool to be engaged with the adjustment element for regulating said bearing structure, and a removable plug normally screwed into said opening and providing a closure for the lubricant which is in contact with said bearing structure within the quill.

4. An adjustable bearing structure for the rotatable spindle of a machine tool, said spindle being rotatably mounted in a quill which is shiftable axially within the bore of a head member of the machine tool, said bearing structure comprising, a pair of opposed tapered roller bearings journalling the spindle in the quill, said quill adapted to confine lubricant in contact with said roller bearings, said bearings having outer races mounted within said quill and having inner races embracing said spindle, said spindle having a shoulder thereon providing a seat for one of said inner races, an adjustment ring threaded on said spindle and engaging the opposite of said inner races, said adjustment ring adapted to change the running fit provided by said bearing upon rotation of the adjustment ring, a set screw threaded in said ring for locking the same in an adjusted position, said ring having a plurality of sockets formed in the periphery thereof providing tool engagement for rotating the ring relative to the spindle when said set screw is loosened, said quill having an opening formed therein providing access to said adjustment ring adapting a tool to be engaged with the sockets of said ring for adjustment thereof, and a removable plug normally screwed into said opening and providing a closure for the lubricant which is in contact with said bearing structure within the quill.

5. An adjustable bearing structure for the rotating spindle of a machine tool, said spindle being journalled in a quill which is shiftable axially within the bore of a head member, sad quill adapted to confine lubricant in contact with the bearing structure, said bearing structure comprising, an anti-friction bearing mounted in said quill and journalling the spindle therein, said bearing having at least one inner race embracing said spindle and having at least one outer race residing within the quill, an adjustment element engaging one of said races, said adjustment element adapted to change the running fit provided by said anti-friction bearing upon regulation of the adjustment element, said quill having an opening therein providing access to said adjustment element, a removable plug normally residing in said opening and providing a closure for the lubricant within the quill, said plug having a socket in the outer portion thereof providing engagement with a tool for removing said plug from the quill, and a grease fitting mounted within said socket, said fitting adapting the nozzle of a grease gun to be inserted into the socket of the plug and into engagement with the grease fitting for forcing lubricant through said plug into the quill in the area occupied by said bearing structure, said plug and grease fitting normally residing in a recessed position relative to the periphery of said quill and adapted to reside within the bore of said head member when the quill and spindle are shifted to a retracted position.

6. An adjustable spindle bearing structure for the rotating spindle of a machine tool, said spindle being journalled in a quill which is shiftable axially within the bore of a head member, said quill adapted to confine lubricant in the area of said bearing structure, said bearing structure comprising, an antifriction bearing mounted in said quill and journalling the spindle therein, said bearing having an inner race embracing said spindle and having an outer race residing within the quill, an adjustment ring engaging one of said races, said adjustment ring adapted to change the running fit provided by said anti-friction bearing upon rotation of the adjustment ring relative to the quill, said quill having an opening therein providing access to said adjustment ring for rotating the same, a removable plug normally screwed into said hole and providing a closure for the lubricant within the quill, said plug having a socket in the outer portion thereof providing engagement with a tool for removing the plug from the quill, and a grease fitting mounted at the inner end of said socket and communicating with the interior of the quill, said fitting adapting the nozzle of a grease gun to be inserted into the socket of the plug and into engagement with the grease fitting for forcing lubricant into the quill in the area occupied by said bearing structure, said plug and grease fitting normally residing in a recessed position relative to the periphery of said quill and adapted to reside within the bore of said head member when the quill and spindle are shifted to a retracted position.

7. An adjustable bearing structure for the rotatable spindle of a machine tool, said spindle being rotatably mounted in a quill which is shiftable axially within the bore of a head member of the machne tool, said quill adapted to confine lubricant in contact with said bearing structure, said bearing structure comprising, a pair of opposed taper roller bearings, said bearings having outer races mounted within said quill and having inner races embracing said spindle, an adjustment ring threaded on said spindle and engaging one of said inner races, said adjustment ring adapted to change the running fit provided by said bearing upon rotation of the adjustment ring, means on said ring for locking the same in an adjusted position, said quill having an opening formed therein providing access to said adjustment ring adapting a tool to be engaged therewith, a removable plug normally screwed into said opening for sealing the lubricant which is in contact with said bearing structure within the quill, said plug having a socket in the outer portion thereof providing engagement with a tool for removing said plug, and a grease fitting mounted at the inner end of said socket and communicating with the interior of the quill, said fitting adapting the nozzle of a grease gun to be inserted into said socket and into engagement with the grease fitting for forcing the lubricant into the quill in the area occupied by said bearing structure, said plug and grease fitting normally residing in a recessed position relative the periphery of said quill and adapted to reside within the bore of said head member when the quill and spindle are shifted to a retracted position.

References Cited in the file of this patent

UNITED STATES PATENTS

| | | |
|---|---|---|
| 2,188,251 | Nelson | Jan. 23, 1940 |
| 2,809,475 | Smith | Oct. 15, 1957 |